Aug. 27, 1957 — R. I. BURROUGHS — 2,804,033
PLANT SETTING MACHINE
Filed Oct. 2, 1953. 3 Sheets-Sheet 1

Robert I. Burroughs
INVENTOR.

Aug. 27, 1957  R. I. BURROUGHS  2,804,033
PLANT SETTING MACHINE

Filed Oct. 2, 1953  3 Sheets-Sheet 2

Robert I. Burroughs
INVENTOR.

Aug. 27, 1957　　　R. I. BURROUGHS　　　2,804,033
PLANT SETTING MACHINE

Filed Oct. 2, 1953　　　　　　　　　　　　3 Sheets-Sheet 3

Robert I. Burroughs
INVENTOR.

BY
Attorneys

United States Patent Office 2,804,033
Patented Aug. 27, 1957

2,804,033

PLANT SETTING MACHINE

Robert I. Burroughs, Henderson, N. C.

Application October 2, 1953, Serial No. 383,720

2 Claims. (Cl. 111—3)

This invention relates to a plant setter and particularly to a power operated device for planting tobacco plants, cabbage plants, sweet potato plants and the like.

In the operation of plant setting machines it has heretofore been customary to use devices having a shoe to open a furrow and supporting platforms adjacent to the shoe so that an operator may manually place a plant in the furrow after which a suitable furrow closing device will move the dirt about the plant. It is also frequently customary to provide periodic water discharge devices so that the plant may be set in a quantity of water and thus have a better chance of living over the transplanting.

It has also been customary to use a so-called dibble type of planter in which a rotary wheel is provided with planter buckets under which a plant may be dropped and which will open at a predetermined portion of the revolution of the wheel to release the plant into a furrow or into an aperture produced by the point of the dibble itself.

These devices have been quite inconvenient and exhausting for the operators who must ride in a substantially prone position adjacent to the shoes of the normal planting machine and the dibble-type machines have been quite inaccurate and unsatisfactory in transplanting the plants.

The present invention overcomes these difficulties by providing a plant setting machine in which the operators may sit upright in a convenient comfortable operator station so that there will be no unnecessary fatigue from uncomfortable operating positions. The plants are carried by setting fingers which automatically open and close to receive the plant at one position of the operating cycle and to open at another portion and deposit the plant. A furrow opening device is so mounted with respect to the operating frame that it will follow the contours of the ground so that the furow will be of substantially a constant depth regardless of the contour and also the device will move up and down on the contour of the ground so that the setting fingers will extend into the furrow to deposit the plant therein after which the soil will be compacted about the roots of the transplanted plants. As is usual in such devices a surge of water will be supplied and a control valve responsive to the operation of the setting fingers will release water into the furrow to properly irrigate the plants during the transplanting intervals.

It is accordingly an object of the invention to provide an improved plant setter.

It is a further object of the invention to provide a plant setter operable over various ground contours.

It is a further object of the invention to provide a plant setter having fingers adapted to receive plants at one portion of a cycle and to deposit the plants at another portion.

It is another object of the invention to provide a machine which may be adjusted for various types of soil.

Other objects and many of the attendant advantages of the present invention will be apparent from the following detailed description taken in conjunction with the accompanying drawings, in which.

Figure 1:
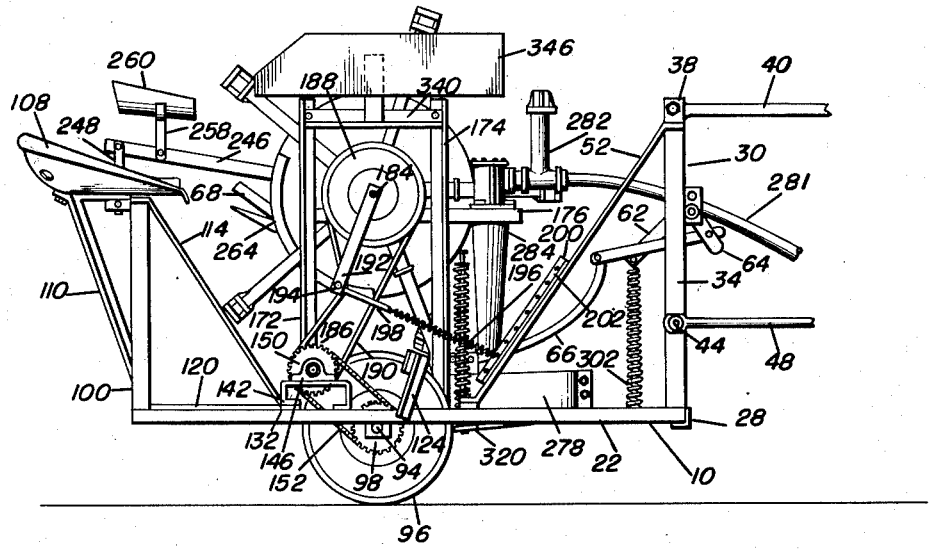
Figure 1 is a side elevation of a plant setting machine according to the invention.
Figure 2:
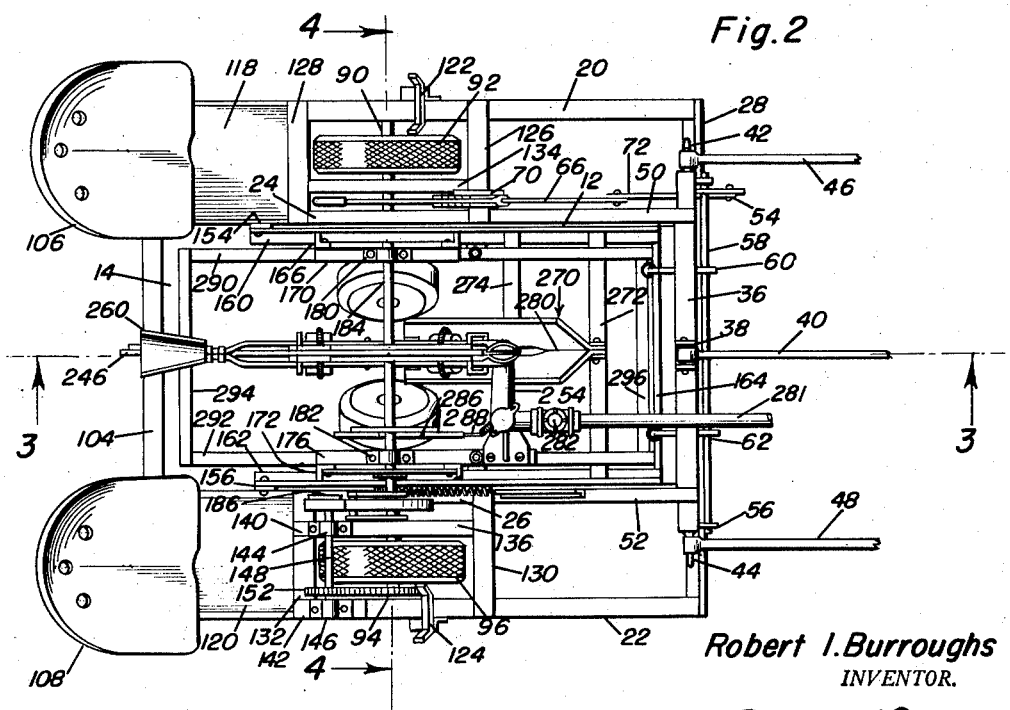
Figure 2 is a top plan view of the plant setter with the tray members omitted.
Figure 3:
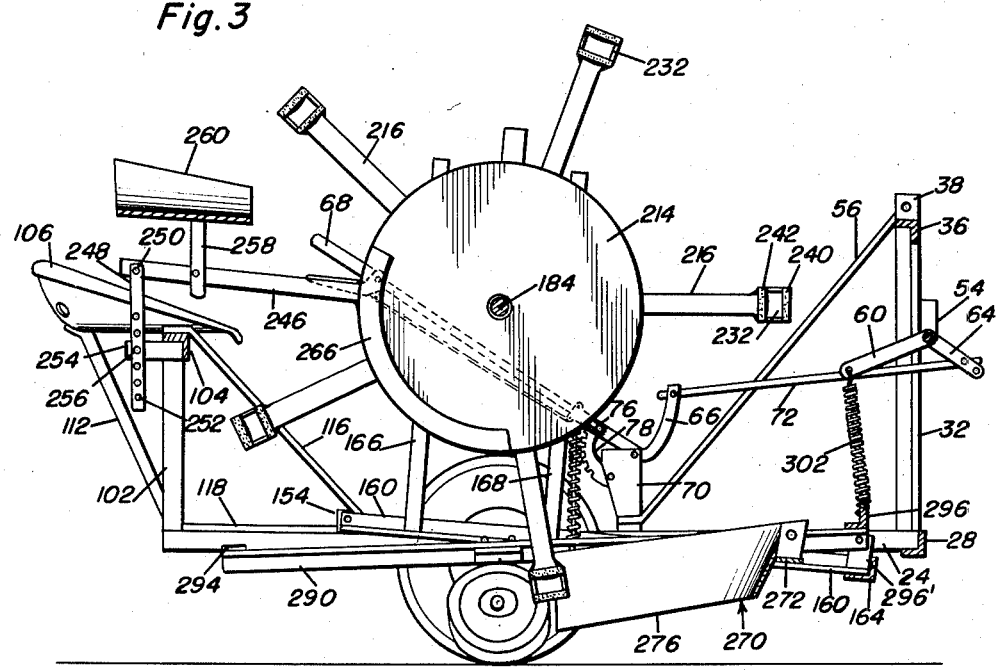
Figure 3 is a vertical section of the plant setter taken substantially on the plane indicated by the section line 3—3 of Figure 2.
Figure 4:
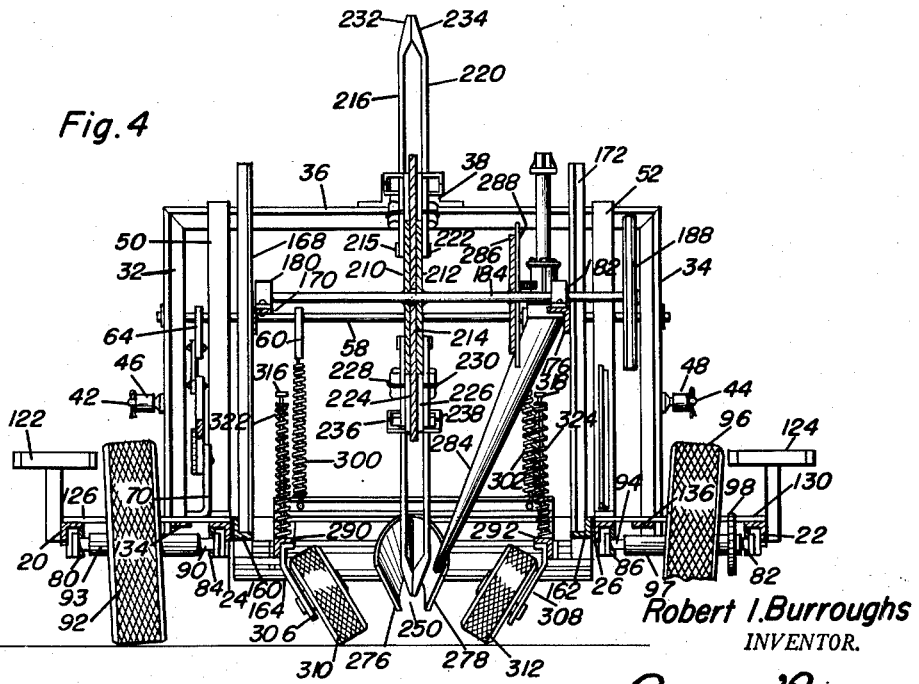
Figure 4 is a transverse section through the plant setter taken substantially on the plane indicated by the section line 4—4 of Figure 2.
Figure 5:
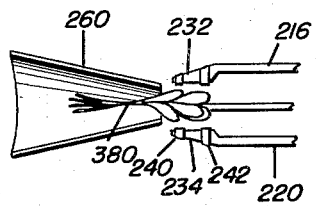
Figure 5 is a fragmentary plan view of the setting fingers in position to receive a plant.
Figure 6:
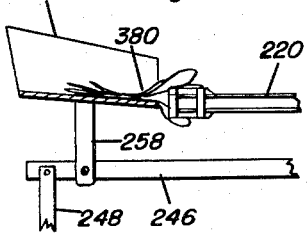
Figure 6 is a fragmentary elevational view showing the setting fingers receiving the plant.
Figure 8:
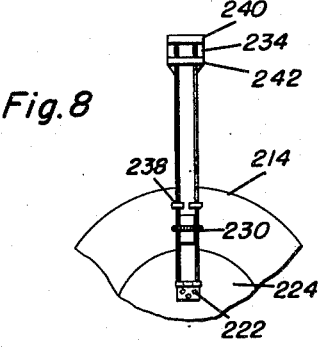
Figure 8 is a detail elevation of a setting finger and the carrying arm therefor.
Figure 9:
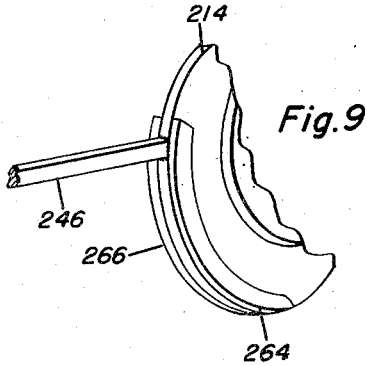
Figure 9 is a detail perspective view of the timing disk and cam.

In the exemplary embodiment of the invention the planter comprises a main frame 10, an intermediate frame 12 and an inner frame 14, the frames being articulated with respect to each other whereby the intermediate frame 12 and the main frame 10 are hingedly connected together adjacent the rear ends thereof and the intermediate frame 12 and the inner frame 14 are hingedly connected together adjacent the forward end thereof.

The main frame 10 is composed of lateral frame members 20 and 22 and inner frame members 24 and 26 which are rigidly spaced with respect to each other and provide longitudinally extending slide members for the main frame. The forward ends of the members 20, 22, 24 and 26 are rigidly connected together by a transverse beam 28. An upstanding head frame 30 is mounted on the transverse beam 28 and is constructed of a pair of vertical standards 32 and 34 connected together by means of a transverse beam member 36. A mounting bracket 38 is secured on the top of the transverse beam 36 for receiving the usual hitch bar 40 of a tractor hydraulic mounting device such as that used on a modern tractor. Laterally projecting pivot pins 42 and 44 are mounted on the vertical members 32 and 34 for receiving the usual lift arm attachments 46 and 48 of the hydraulic attachments for the usual tractor.

Braces 50 and 52 extend between the longitudinal beams 24 and 26, respectively, and the cross beam 36 to rigidify the main frame.

A pair of mounting brackets 54 and 56 are secured on the front sides of the members 32 and 34, respectively, and a lifting rod 58 is journaled therein. Lifting arms 60 and 62 are rigidly fixed in spaced relation on the lifting shaft 58 and the control arm 64 is likewise rigidly fixed on the lifting shaft 58.

A bellcrank member having an arcuate arm 66 and a lever arm 68 is pivotally mounted in a bracket 70 rigidly fixed on the longitudinal member 24 and having the arcuate arm 66 connected to the arm 64 by means of a link 72. A control detent 76 is placed on the arm 68 and cooperates with an arcuate quadrant 78 attached to the bracket 70.

A shaft retaining bracket 80 is mounted on the longitudinal member 20 and a shaft retaining bracket 82 is mounted on the longitudinal member 22 while a shaft retaining bracket 84 is mounted on the longitudinal member 24 and a shaft retaining bracket 86 is mounted on the longitudinal member 26 with a shaft 90 mounted between the brackets 80 and 84 and having a wheel 92 provided with an extended hub 93 journaled thereon for supporting the setter. Likewise a shaft 94 extends between the brackets 82 and 86 and a wheel 96 provided with an extended hub 97 is journaled thereon for likewise supporting the setter. A sprocket wheel 98 is rigidly attached to the hub 97 carrying the wheel 96 for a purpose presently to be described.

The shafts 90 and 94 are slightly inclined or crowned by elevating the brackets 84 and 86 with respect to the brackets 80 and 82 to provide the wheels 92, 96 with a slight camber so that the setter tends to correctly follow the drawing vehicle to plant a straight row instead of yawing about and producing a sinuous row which would be difficult to cultivate.

Upwardly extending posts 100 and 102 are fixed on the side members 22, 20 and are joined together by means of a transverse member 104 on which is mounted a pair of operator's seats 106 and 108. Rearwardly directed braces 110 and 112 are connected to the uprights 100 and 102, respectively, for supporting the rear portions of the seats 106 and 108, respectively. If desired, longitudinally slanting braces 114 and 116 may be provided between the longitudinally extending main frame 10 and the transverse member 104. Platforms 118 and 120 are provided between the longitudinally extending frame members 20, 24 and between the longitudinally extending frame members 22, 26 to receive the feet of the operators. Stirrups 122 and 124 are mounted alongside of the wheels 92 and 96, respectively on the frame members 20, 22. Transverse wheel guards 126 and 128 are mounted fore and aft of the wheel 92 and similar transverse guards 130 and 132 are mounted fore and aft of the wheel 96 and a longitudinal side guard 134 is mounted between the wheel 92 and the longitudinal frame member 24. Likewise a longitudinal bearing member 136 extends between the transverse guard members 130 and 132 alongside of the wheel 96. Mounting brackets 140 and 142 are mounted adjacent to the wheel 96 and bearings 144 and 146 are mounted thereon with a drive shaft 148 journaled therein. A sprocket wheel 150 is mounted on the drive shaft 148 and a sprocket chain 152 is entrained over the sprocket gears 98 and 150 so that the drive shaft 148 is driven in response to the rotation of the wheel 96.

An upstanding ear 154 is secured adjacent the rear end of the longitudinal member 24 and an ear 156 is secured in opposed relation on the longitudinal member 26.

The intermediate frame member 12 includes a longitudinal side member 160 and a longitudinal side member 162 with the rear ends of the side members 160 and 162 pivotally mounted on the ear members 154 and 156 and the forward ends of the members 160 and 162 joined together by means of a transverse beam member 164. A standard including two upstanding risers 166 and 168 is mounted on the longitudinal side member 160 and are joined together intermediate the length thereof by means of a transverse member 170. Likewise a column constitutes a pair of members 172 and 174 joined together by means of a transverse member 176 which extends forwardly past the member 174 for a purpose presently to be described.

A bearing bracket 180 is mounted on the transverse member 170 and a bearing bracket 182 is mounted on the transverse member 176 and a transverse shaft 184 is journaled in the bearings 180 and 182.

A sheave 186 is mounted on the drive shaft 148 and a sheave 188 is mounted on the transverse shaft 184 and the sheaves 186 and 188 are connected together by means of a suitable flexible transmission element such as a belt 190. An idler arm 192 is mounted in journal relation on the shaft 184 and contains a roller 194 for contact with the belt 190, the tension being maintained by means of a spring 196 connected between the link 198 secured to the arm 192 and a bracket 200 secured on the brace 52. The bracket 200 is supplied with a plurality of apertures 202 so that the spring 196 may be adjusted to control the tension of the belt 190.

The plant handling device includes a pair of disks 210 and 212 rigidly fixed in closely spaced relation on the shaft 184 and having a cam plate 214 mounted on the shaft 184 between the disk 210 and 212. A plurality of setter fingers 216 are hingedly connected to the disk 210 by means of hinge joints 218. There are a plurality of setter fingers 220 hingedly connected to the disk 212 by means of hinge joints 222. The fingers 216 and 220 are arranged in pairs in opposed relation to provide pairs of cooperating setter fingers arranged around the periphery of the disks 210 and 212. Radial arms 224 are provided on the disk 210 and extend radially outward along the fingers 216 and similar arms 226 are provided on the rim of the disk 212 and extend along the fingers 220. Spring members 228 are connected to the arms 224 and extend around the fingers 216 so that the fingers 216 are firmly urged toward the disk 210 or rather toward the arms 224 and similar springs 230 urge the fingers 220 toward the arms 226 so that the tips 232 and 234 of the fingers 216 and 220 are resiliently urged into contact with each other.

Retaining brackets 236 and 238 retain the fingers 216 and 220, respectively, so that in the event the springs 228 and 230 should be broken the fingers 216 and 220 will not be too radically moved away from the disks 210 and 212.

The tips 232 and 234 are preferably provided with a rubber band 240 and 242 to provide a cushioning surface to receive plants as will presently be described.

The plate 214 has a laterally extending arm 246 rigidly connected thereto and extending rearwardly therefrom and a link 248 is connected to the arm 246 by means of a pin 250. Link 248 is provided with a plurality of apertures 252 and is connected to a suitable bracket 254 by means of a pin 256 so that the position of the arm 246 may be adjustably secured with relation to the shaft 184. An upstanding link 258 is rigidly mounted on the arm 246 and a V-shaped trough 260 is mounted on said link 258. The length of the upstanding link 258 is such that the trough 260 is on a straight line between the shaft 184 and the ends of cam mme eb4sr62IOETAOI SHR and the ends of cam members 264 and 266 mounted on the plate 214. The cams 264 and 266 extend slightly over a quarter of the periphery of a path maintained by the fingers 216 and 220 and causes opening of the fingers as will presently be described.

A shoe 270 is mounted on a cross member 272 extending between the longitudinal members 160 and 162 and is supported by means of diagonally arranged braces 274 extending inwardly from the members 160 and 162, respectively. The shoe 270 is preferably provided by two side members 276 and 278 which are secured together adjacent the front end thereof and diverge outwardly and upwardly to provide a narrow trough 280 adjacent the bottom thereof.

A water supply hose 281 connected to any suitable source of water such as a tank (not shown) is connected to a valve 282 which is mounted on a forwardly extending end of the longitudinal member 176 and is provided with a chute 284 extending downwardly into the shoe 270 for delivering water thereto. Operation of the valve 282 is controlled by a disk 286 mounted on the shaft 184 and having contact fingers 288 periodically actuating the valve 282 for allowing a portion of water to be discharged into the shoe 270.

The inner frame 14 is provided with longitudinal side members 290 and 292 are secured together adjacent the rear by transverse beam 294 and adjacent the front end by means of a transverse beam 296. The forward ends of the members 290, 292 are connected to suitable ears 296' mounted on the intermediate frame 12 so that the forward end of the inner frame 14 is mounted on the forward end of the intermediate frame 12 and for vertical hinge motion with relation thereto. Springs 300 and 302 are mounted between the arms 60 and 62, respectively, so that when the bellcrank is operated to raise the arms 60 and 62 the springs 300 and 302 are tensioned to lift the forward ends of the intermediate and inner frames.

Angulated brackets 306 and 308 are mounted on the side members 290 and 292, respectively. Compression rollers 310 and 312 are journaled on the brackets 306 and 308 adjacent to the furrow created by the shoe 270 compacting the dirt above the ground.

In order to secure a constant urging of the wheels 310 and 312 into contact with the earth compression bolts 316 and 318 extend through apertures in the side members 290 and 292 and connect to brackets 320 mounted on the side members 160 and 162, respectively. Compression springs 322 and 324 are mounted on the bolts 316 and 318, respectively, so that the springs 322 and 324 constantly urge the side members 290 and 292 downwardly with respect to the intermediate frame 12.

In order to support the plants in front of the operators, a longitudinal member 342 is mounted on uprights 172, 174 respectively and a tray member 344 is mounted on the longitudinal member by means of a standard 348. A similar tray, not shown, may be similarly mounted on the uprights 166, 168.

Figure 7:
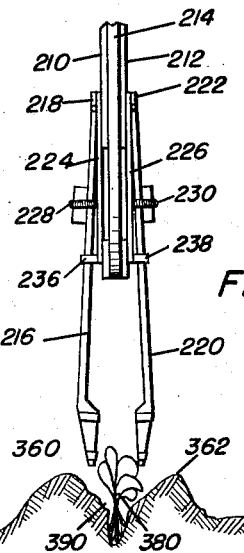
Figure 7 is a fragmentary longitudinal view showing the setting fingers in plant releasing position.
Figure 10:
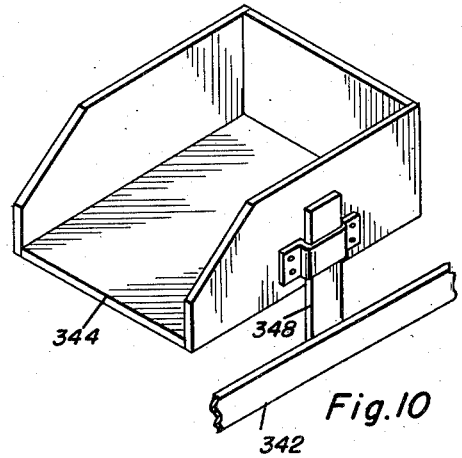
Figure 10 is a perspective view of a plant hopper for the planter.

In the operation of the setter according to the invention the main frame is attached by means of the hitching frame to any suitable tractor device. A tank of water not shown will be carried by the tractor device and connected through the conduit 280 to the valve 282. When it is desired to begin the setting operation the bellcrank will be operated to lower the forward ends of the frames 12 and 14 so that the shoe 270 will be lowered into contact with the ground. Forward movement of the device will then cause rotation of the drive shaft 148 which, in turn, will rotate the shaft 184 and the operator will alternately place plants within the trough 260 with the upper leafy top of the plants into the path of rotation of the fingers 216 and 220 and as the fingers 216 and 220 are released from the ends of the cams 264 and 266 the rubber encased faces will seize the top of the plants and firmly grip the same. As the device moves onward the plants will be held firmly by the fingers until the ends of the fingers have entered the furrow produced by the shoe 270 after which time the end of the cams will again contact the fingers to raise the fingers from the plant as shown in Figure 7. The fingers will then extend upward to again receive a plant. Any desired number of pairs of fingers may, of course, be mounted on the disk.

As the setter continues to advance the compacting wheels 310 and 312 will compress the dirt ridges 360 and 362 torn up by the shoe 270 about the roots of the plants 380. Simultaneously with the rotation of the fingers to carry the plants the disk 286 will move the fingers 288 to actuate the valve 282 and produce a helping of water into the furrow with each of the plants deposited therein.

Since release of the plant 380 is dependent to a certain extent on the soil being worked, the cam members 264 and 266 may be adjusted slightly so that the plant may release sooner or later as may be desired so that the roots or tops of the plants will not be injured or smothered because of the looseness or depthness of the soil being worked.

It will thus be apparent that the present invention has provided a plant setter which may be utilized to plant any suitable type of transplantable plants and that the same will be readily handled without the back breaking work heretofore necessary in such transplanting.

For purpose of exemplification a particular embodiment of the invention has been shown and described according to the best present understanding thereof. However, it will be apparent to those skilled in the art that many changes and modifications may be made in the construction and arrangements of the parts thereof without departing from the true spirit and scope of the invention.

What is claimed as new is as follows:

1. In a plant setting machine, a frame, a transverse rotatable shaft carried by said frame, ground wheels on said frame one of which is drivingly connected to said shaft, a pair of laterally spaced disks fast on said shaft and having radial planting fingers thereon extending outwardly thereof in opposite pairs, means hingedly mounting said fingers on said disks for rotation thereby through a cycle of movement and separation and engagement in the pairs, spring means connecting the fingers of the pairs for normally engaging the pairs, a circular cam plate journaled on said shaft between said disks and having a pair of opposite arcuate cams thereon engageable with said pairs of fingers to separate the fingers in the pairs during a portion of their cycle of movement, said plate being rotatably settable on said shaft to angularly adjust said cams for separating the fingers in the pairs at different points in their cycle of movement and then releasing said fingers, a lever on said plate for setting the same, and means for attaching said lever to said frame for holding said plate in set position.

2. The combination of claim 1, and a trough on said lever spaced outwardly of the path of movement of said fingers for supporting plants in overlying position thereon for grasping by the pairs of fingers, said trough being positioned adjacent one end of the cams for grasping of the plants thereon by said pairs of fingers simultaneously with release of said fingers by said cams.

References Cited in the file of this patent

UNITED STATES PATENTS

| | | |
|---|---|---|
| 491,597 | Sailer | Feb. 14, 1893 |
| 532,740 | Gundersen | Jan. 15, 1895 |
| 653,298 | King | July 10, 1900 |
| 653,625 | Morgan | July 10, 1900 |
| 1,026,492 | Bruhn | May 14, 1912 |
| 1,073,702 | Owens | Sept. 23, 1913 |
| 1,651,851 | Synck | Dec. 6, 1927 |
| 1,851,936 | Oppenheim | Mar. 29, 1932 |
| 2,372,739 | Renault | Apr. 3, 1945 |
| 2,475,078 | Cherry | July 5, 1949 |
| 2,486,462 | Carelock | Nov. 1, 1949 |
| 2,518,570 | Renault | Aug. 15, 1950 |
| 2,601,834 | Carter | July 1, 1952 |
| 2,625,122 | Carelock | Jan. 13, 1953 |